Aug. 16, 1966 P. J. BELANGER 3,266,100
MOLDING APPARATUS

Original Filed March 2, 1961 4 Sheets-Sheet 1

INVENTOR.
PAUL J. BELANGER
BY Stanley Sacks
ATTORNEY.

Aug. 16, 1966     P. J. BELANGER     3,266,100
MOLDING APPARATUS

Original Filed March 2, 1961     4 Sheets-Sheet 2

INVENTOR.
PAUL J. BELANGER
BY Stanley Sacks

ATTORNEY.

Aug. 16, 1966  P. J. BELANGER  3,266,100
MOLDING APPARATUS
Original Filed March 2, 1961  4 Sheets-Sheet 3
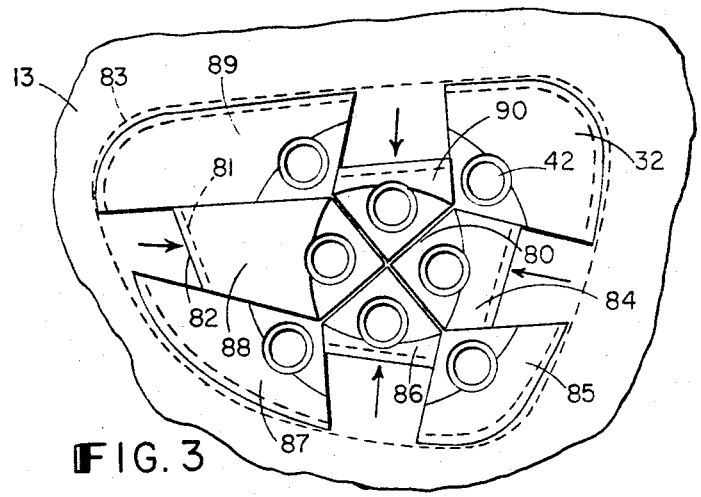
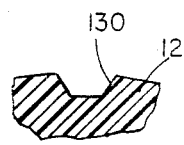
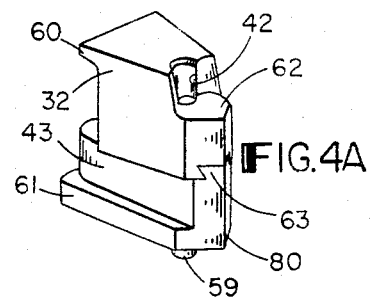
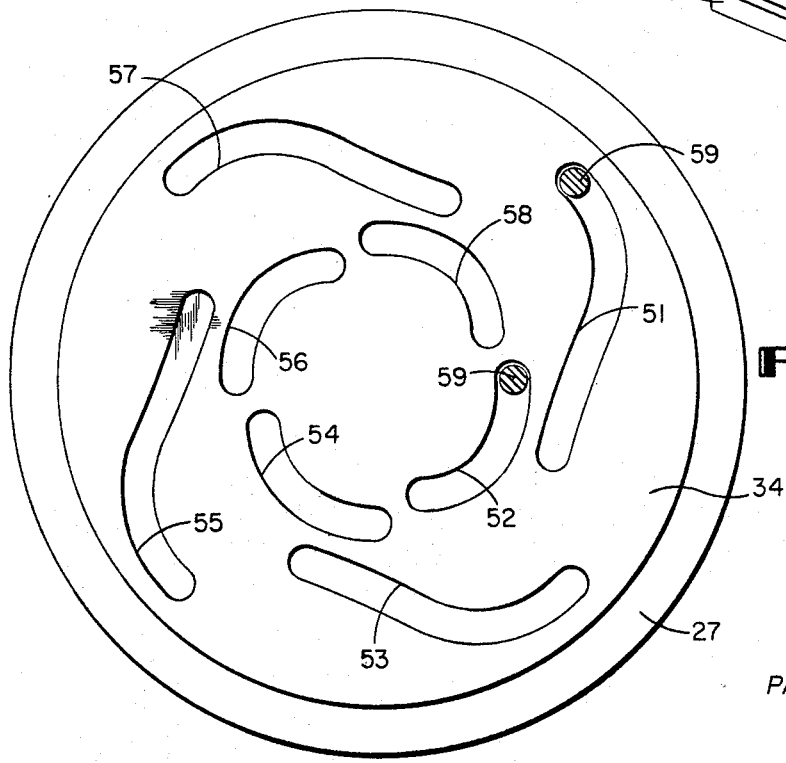
INVENTOR.
PAUL J. BELANGER
BY Stanley Sacks
ATTORNEY.

Aug. 16, 1966          P. J. BELANGER            3,266,100
                        MOLDING APPARATUS

Original Filed March 2, 1961                4 Sheets-Sheet 4

INVENTOR.
PAUL J. BELANGER.
BY Stanley Sacks
                ATTORNEY.

United States Patent Office 3,266,100
Patented August 16, 1966

3,266,100
MOLDING APPARATUS
Paul J. Belanger, Leominster, Mass., assignor to Foster Grant Co., Inc., Leominster, Mass., a corporation of Delaware
Continuation of application Ser. No. 92,809, Mar. 2, 1961. This application Nov. 18, 1963, Ser. No. 324,495
9 Claims. (Cl. 18—45)

This invention relates generally to the art of manufacturing molded articles and the apparatus therein employed. More specifically, this invention relates to a method and apparatus for making a continuous or discontinuous groove or indentation in a molded thermoplastic object during the molding thereof. This application is a continuation of application Serial No. 92,809, filed March 2, 1961, for "Molding Apparatus," now abandoned.

While my apparatus may be adapted for use on many articles, I have found it to be most advantageous when employed in molding generally polygonal lens grooves in sun or prescription eyeglass frames.

The formation of lens grooves in eyeglass frames has long been a problem in the art. Many methods have been devised for forming such grooves. Major difficulty arises in attempting to mold the eyeglass frame with the groove in each eye wire, i.e., the plastic lens holding portion of the frame. In such a molding procedure, the groove formation results in an "undercut" rim, i.e., the die lip that forms the groove, occupies the groove in the molded frame and when the mold is opened the die tends to prevent the eyeglass frame from being ejected from the mold. Workers in the art have experimented with various means of providing collapsible core dies that will expand to form the groove in the frame when the mold is closed and will contract or collapse to clear the undercut rim when the mold is opened, allowing ejection of the frame from the die. However, to my knowledge, none of these experimental collapsible core dies have achieved commercial acceptance due to their mechanical unreliability and resultant erratic functioning.

Many workers in the field have avoided the problem in its entirety by resorting to a method of heat-sealing the lenses in the frame. In the heat sealing procedure, the lens is inserted in an eye wire portion of the frame and placed against a molded stop or rim. The edge of the eye wire is then heated and rolled over to seal the lens in position. This procedure is costly and time-consuming.

Other workers in the field have obtained a desirable grooved eyeglass frame by a two step operation. The frame is first molded and then in a second step a three walled, trough-shaped groove is cut by hand or machine, in the molded frame. This method is unduly costly and time-consuming.

I have now devised a feasible collapsible core die assembly which enables one step lens groove formation in molded frames, i.e., the groove is formed during the molding of the frame. Unlike previous attempts in the art, my device is reliable, durable and commercially advantageous.

One object of my invention is to provide an apparatus and method for forming a generally polygonal groove in a plastic article during the molding of such article without affecting the mold release characteristics of such article.

Another object of this invention is to provide an apparatus and method for forming a lens groove in a molded eyeglass frame during the molding thereof in a rapid, economical and time-saving manner.

These and other objects will become apparent from the following description and drawings embodying my invention which are merely illustrative of my invention but are not to be taken as limiting. In the drawings like numerals indicate like parts.

FIGURE 3 is a plan view of the collapsible segments of this invention in the collapsed position.

FIGURE 4A is a perspective view of a sliding segment of this invention.

FIGURE 5 is a plan view of the face cam surface of my invention.

FIGURE 6 is a cross-section through the eye wire portion of an eyeglass frame.

The machine of my invention is preferably used to form a lens groove of the type shown in FIGURE 6. The lens groove 130 shown in FIGURE 6 is a three walled groove which is adapted for insertion therein of a conventional sunglass or prescription lens. Although I have shown a three walled groove it is obvious that rounded or other cross-sectional shaped grooves may also be formed employing the apparatus and method of my invention.

The apparatus of my invention is composed of four basic sections, i.e., mold cavity blocks, a collapsible core die assembly, a substantially cylindrical barrel cam and an actuating plate assembly.

Figure 1A:
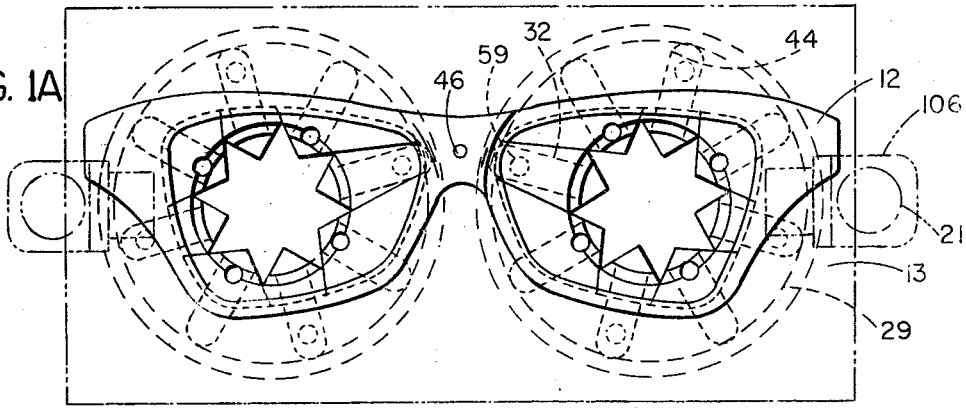
FIGURE 1A is a top view of the device of FIGURE 1 along line 1A—1A in an enlarged scale drawing.
Figure 1:
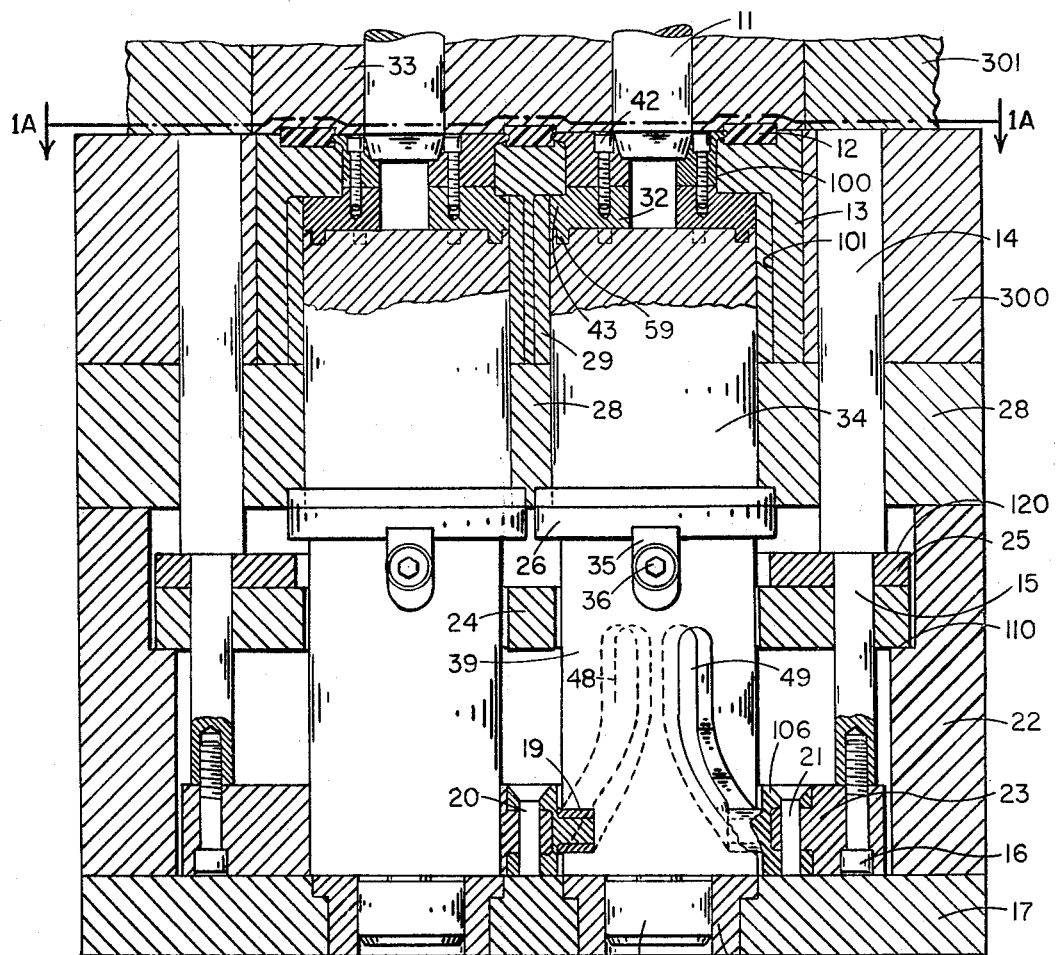
FIGURE 1 is a side section of a molding apparatus embodying my invention, with the mold closed.
Figure 2:
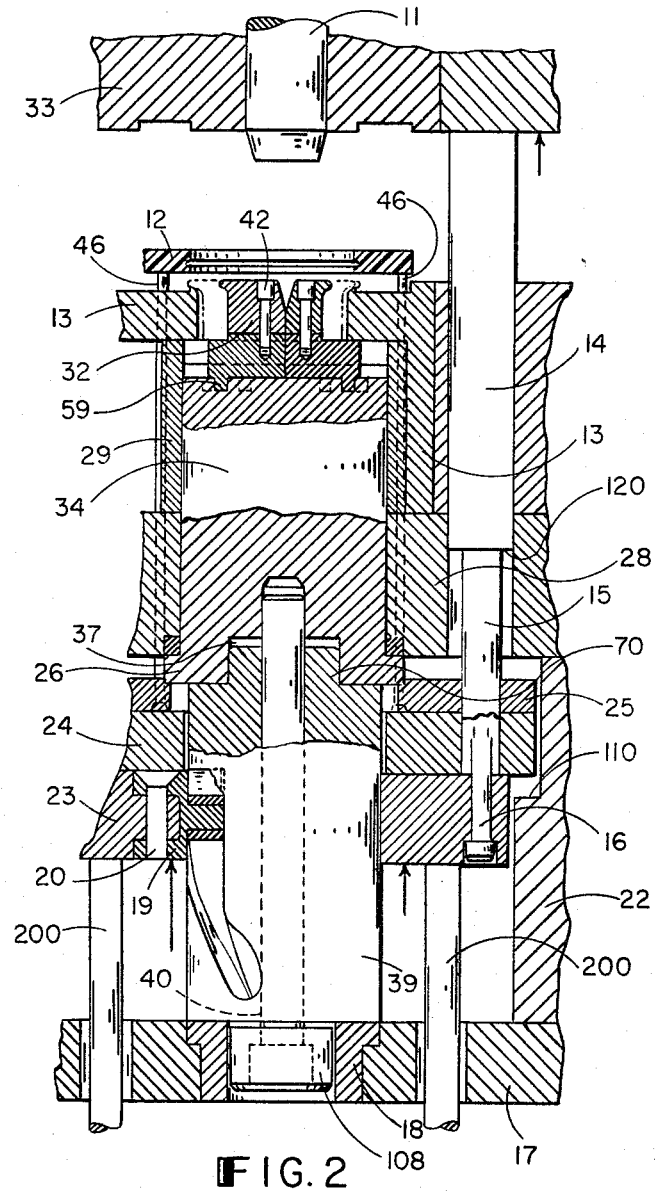
FIGURE 2 is a fragmentary side section of the invention substantially as shown in FIGURE 1, with the mold open.

The mold cavity blocks utilized in my invention are essentially conventional eyeglass frame mold cavity blocks and comprise (as shown in FIGURES 1 and 2) an injection cavity block 33 and an ejection cavity block 13. Block 33 carries a conical wedge 11, the function of which will be described later. Ejection cavity block 13 comprises a conventional mold cavity for an eyeglass frame. However, the main point of difference of my blocks from conventional cavity blocks is that when the mold is closed as at FIGURE 1 a collapsible core die assembly or sliding segment section is inserted into the cavity to form a desired lens groove. Ejection cavity block 13 is adapted to receive the collapsible core die assembly in axially aligned circular bores 100 and 101.

The second basic section of my invention is the collapsible core die assembly or sliding segment section. This section comprises the sliding segments or blocks along with the means for mounting or retaining said segments. As most clearly seen in FIGURE 3, eight segments are preferably employed, 32, 84, 85, 86, 87, 88, 89, 90, although the number may vary if desired.

Figure 4:
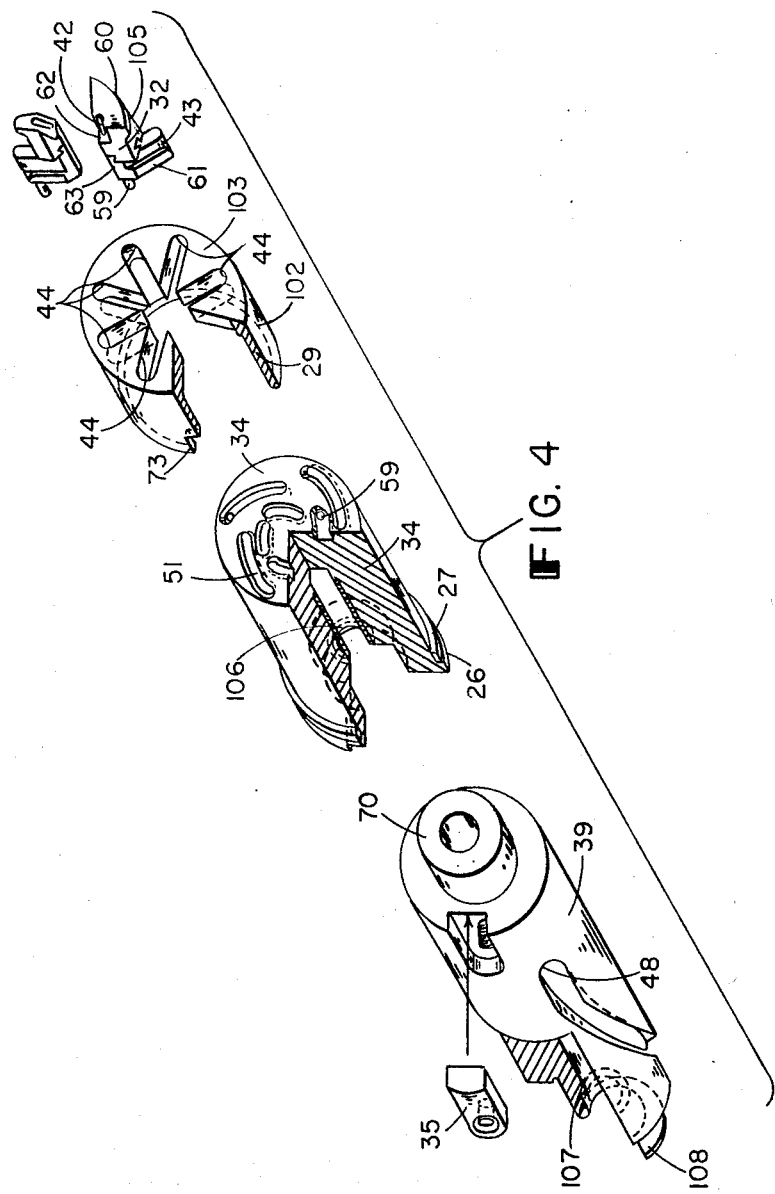
FIGURE 4 is an exploded view of the barrel cam, retainer cup and representative segments of this invention.

The segments are each essentially two piece elements, the base portion being composed of (as best seen in FIGURES 4 and 4A) a first integral member comprising a cam follower pin 59, a broad base 61, and a narrow slide portion 43. The first integral member is attached to a top enlarged portion 32 having a groove shaping outwardly extending lip 60, an arcuate walled flat base cut-out portion 62 and arcuate outer wall 105. The shape of the segments may be modified, for example, as shown in FIGURE 2 wherein flat base cut-out portion 62 is eliminated. The top and bottom portions are held together by means of locking key 63 and circular pin 42 which extends through portion 32 into portion 43. The upper portion of pin 42 as seen in FIGURE 4A is machined so as to conform with the arcuate wall, flat based cut-out portion 62. The inner portion 80 of each segment is preferably formed in a V-shape. If desired, the segments can be cast or machined as one-piece units.

The eight segments are retained in position within the ejection cavity block 13 by means of a T-slide retainer cup 29. T-slide retainer cup 29 is a generally inverted cup, as shown in FIGURES 1, 2 and 4, comprising a substantially cylindrical portion 102 and a flat top portion 103, having slots or sliding guideways 44 therein. As can be readily seen, each sliding segment is positioned in the T-slide retainer cup 29 with portion 43 thereof placed in a slot 44, base portion 61 and top portion 32 act as stops to retain the segment in the slot. Obviously, the segments are slidable in a radial direction when in slots 44. The T-slide retainer cup 29 is fixed in position in bore 101 of ejection cavity block 13 by means of a keying arrangement, the female portion of which is shown at 73.

As seen in FIGURE 3, the segments 32, 84, 85, 86, 87, 88, 89 and 90 are polygonally arranged, having the approximate shapes indicated, i.e., each segment is alternatively larger and smaller than adjacent segments. The shape of each segment or segment block is formed so that the segments are firmly locked in contacting relationship with each other when they are in their outermost position. The top sections of the segments form an uninterrupted outer substantially polygonal rim composed of lips 60 when the segments are in their outermost positions in the slots or guideways 44. The segments are collapsed by movement of the four small sections in towards the center of flat surface 103 and subsequent movement of the four alternate larger sections in a similar manner. In FIGURE 3, dotted line 83 shows the position of outer edges 82 (line 81 indicating the extent of lip 60) of each segment in the expanded position.

The specific means for actuating movement of the segments is an important feature of my invention. I have discovered a specific barrel cam assembly for effecting the desired movements of the segments. I utilize a two piece cylindrical barrel cam having a substantially flat face cam at one end thereof and a set of cam tracks on the cylindrical surface at the other end thereof. The upper portion or piece of the cam comprises a cylindrical member 34 having tracks 51, 52, 53, 54, 55, 56, 57 and 58 therein. The number of tracks on the upper surface will be dependent upon the number of segments employed in this device. Member 34 has a central bore 106 extending from the bottom face of the cylinder in an upward direction. The lower portion of the barrel cam is a substantially cylindrical shaped piece 39 comprising cylindrical boss 70 at the top face thereof. Boss 70 is dimentioned to fit within a mating recess 37 on the bottom surface of portion 34. The lower portion of cylindrical barrel cam 39 comprises a set of cam tracks 48 and 49 (as indicated in FIGURES 4 and 1) extending generally upward from the bottom edge thereof in a curved configuration as shown. It is preferred to use at least two cam tracks on portion 39 in order to increase stability of the mechanical linkage. However, it is possible to employ a single cam track on portion 39. The bottom of cylindrically shaped portion 39 is cut back as indicated at 108 to form a boss. Cylindrical bore 106 extends axially of portion 39 meeting with bore 106 of barrel cam section 34. As best shown in FIGURE 2 a headed bolt 40 extends through bore 107 and is attached within bore 107, preferably by thread means. Key 35 and bolt 36 provide positive positioning means in order to position portions 34 and 39 with respect to each other.

An enlarged view of the upper surface of the barrel cam is indicated at FIGURE 5. Cam tracks 51, 53, 55, and 57 are positioned at the outer most position of the substantially circular surface while cam tracks 58, 52, 54 and 56 are positioned closer to the center of the circular surface. Cam follower pins 59 of the larger segments 32, 85, 87 and 89 are positioned within the inner barrel cam tracks shown in FIGURE 5 while cam follower pins 59 of the smaller segments 84, 86, 88 and 90 are positioned within the cam tracks of the outer cams shown in FIGURE 5. Thus, it can be seen that when the circular surface barrel cam 34 is rotated in a counterclockwise direction, the curved configuration of the inner and outer cam tracks is such as to cause the smaller segments to move in a radially inward direction prior to the movement of the outer segments in the same direction. As a result, sufficient space is created for the larger sections, above noted, to also move in an inward direction along notches 44. It will be noted ridge 26 is provided on barrel cam section 34 with adjacent washer 27. Ring shaped washer 27 provides a wear resistant surface when barrel cam is rotated. Similarly at the lower end a washer or bearing 18 is provided as a wear resistant surface upon which the barrel cam section 39 will rotate.

It is preferred that the barrel cam be made in two sections. This feature is provided in order to assure proper alignment between the face cam on the upper surface of barrel cam portion 34 and the side cams 48 and 49 carried by section 39 of the barrel cam. Cam tracks are first cut in each section of the barrel cam and then the two sections are assembled. At this point, the two cam surfaces can be easily adjusted in relation to one another by rotation along the bolt 40. At the correct point bolt 40 is tightened, locking parts 34 and 39 together. Positive locking is accomplished by means of key 35 and locking pin or bolt 36.

The barrel cam is actuated by means of lower cam follower pins 19 and 106 which are attached to an actuating ejector plate 23 by means of bolts 20 and 21, respectively, as most clearly seen in FIGURES 1 and 2. In order to simplify the drawings only one lower cam follower pin is illustrated in FIGURE 2 and the cam tracks and pins on the left hand portion of FIGURE 1 are not shown. The actuating ejector plate 23 is operatively connected to a return shaft comprising a shaft portion 15 by means of bolt 16. Shaft portion 15 is smaller in diameter than shaft portion 14 which is axially arranged thereon. Shaft portion 14 is actuated by the downward motion of injection half of the conventional mold frame. Conventional pin plate 25 and ejector plate 24 are provided having holes therein allowing for sliding passage of pin 15.

The operation of the apparatus and the opening and closing cycle is most clearly seen in FIGURES 1 and 2. In the closed position the injection cavity block lies upon the ejection cavity block 13. At that time, segments 32, 84, 85, 86, 87, 88, 89 and 90 are in their outer position in the radial slots 44 of the T-slide retainer cup 34. Substantially circular wedge 11 engages the circular walled, flat-face cut-out 62 of each of the eight segments, thus providing a positive locking arrangement for the segments within the cavity. When the mold is closed actuating ejector plate 23 rests in the lower most position at the base of the molding apparatus adjacent base plate 17. At this point molten thermoplastic material is introduced into the mold cavity and soldified therein. When the injection cavity block is raised as in FIGURE 2, conventional bumper pins 200 are actuated causing the actuating ejector plate 23 to move in an upward direction. Alternately, shaft portion 14 may be firmly affixed to the injection mold cavity block and be actuated by upward movement thereof. Bumper pins 200 are illustrated only in FIGURE 2 in order to simplify the drawings. The upward movement of the actuating ejector plate initiates two separate mechanical movements within the molding apparatus. As the actuating ejector plate moves in an upward direction, when the mold is opened, affixed cam follower pins 19 and 106 also move upwardly, sliding along cam tracks 48 and 49 respectively. Cam tracks 48 and 49 are angularly arranged as shown so that the upward movement of the cam follower pins 19 and 106 causes the cylindrical barrel cam comprising portions 34 and 39 to rotate in a counterclockwise direction. The rotation of the cylindrical barrel cam with integrally formed face cam follower tracks actuates collapsible segments, 32, 84 85, 86, 87, 88 and 90 to move inwardly as previously described. The lips 60 of each segment are withdrawn from the eyeglass frame. The upwardly moving actuating ejector plate 23 then contacts the under surface of conventional flat ejector plate 24. Plate 24 is at all times in contact with conventional ejector pin plate 25 and normally rests on stops 110 formed in the casing 22 of the molding apparatus. Both conventional ejector plate 24 and ejector pin plate are bored to allow free passage of shaft 15 therethrough. Conventional ejector plate 24 is pushed upwardly by actuating ejector plate 23. This movement, which occurs after the collapsible segments are collapsed, moves pin plate 25 upwardly which in turn moves conventional ejector pins, represented by ejector pins 46, upwardly. The eyeglass frame 12 is ejected from the mold in this manner.

The closing of the mold and resulting downward movement of the injection cavity block will reverse the series of operations described above. The lower portion or shoulder 120 of shaft 14 pushes both ejector pin plate 25 carrying pins 46 and ejector plate 24 to their resting position on stops or shoulders 110. Simultaneously, shaft 15 pushes actuating plate 23 to its lower most position thus again rotating the cylindrical barrel cam and returning the segments to their outermost position. At this point the molding material is introduced into the cavity.

It should be understood that terms such as upward and downward are used to describe the particular apparatus as illustrated. However, it is obvious that the apparatus of my invention may be mounted vertically as shown, or in any desired position with respect to the horizontal. Further, the direction of rotation of the barrel cam necessary to move the segments inwardly or outwardly may be changed if desired by reversal of the direction of the cam track shown.

It will be appreciated that only the new and novel portions of the molding apparatus have been shown and described. Further, while only one half of the molding apparatus has been fully illustrated and described, it is obvious that the other half is a mirror image of the half shown and operates in a similar manner. If desired, several eyeglass frames may be molded simultaneously by providing several mold cavities of the type described herein in a single apparatus. My invention as disclosed herein may be used in conjunction with conventional molding apparatus. Sections such as base plate 17, supports 22, 28, 300 and 301 may be considered to be portions of any conventional molding apparatus. Similarly, the power and drive source and plastic injection apparatus are of a conventional nature.

Many alterations and changes may be made without departing from the spirit and scope of this invention which is set forth in the following claims which are to be construed as broadly as possible in view of the prior art.

I claim:

1. In a molding apparatus, comprising an injection cavity block and an ejection cavity block, the improvement which comprises incorporating a collapsible core die assembly means in the ejection cavity block, said collapsible core die assembly means comprising a plurality of adjacent movable segments forming a generally polygonal ring and each having an overhanging lip at the top thereof facing outwardly of the center of said generally polygonal ring and adapted to form a lens groove in an eyeglass frame, said segments being mounted on an inverted cup shaped retainer, radial slots in a top flat portion of said cup shaped retainer, said segments each being individually slideable in one of said slots and each carrying a cam follower pin at the bottom thereof, said cam follower pins being mounted in cam tracks in an underlying face cam which face cam comprises the top surface of a cylindrical barrel cam, said barrel cam having cam follower tracks on the cylindrical surface thereof, and cam followers engaged in said barrel cam follower tracks and being attached to an actuating ejector plate whereby when said actuating ejector plate is raised said cam followers will slide in the barrel cam tracks and rotate said barrel cam thus turning said face cam tracks and causing said cam follower pins to move radially with respect to said face cam.

2. In a molding apparatus for forming eyeglass frames, comprising an injection cavity block, an ejection cavity block and an ejection plate, the improvement which comprises incorporating a collapsible core die assembly means in the ejection cavity block, said collapsible core die assembly means comprising a plurality of adjacent moveable segments forming a generally polygonal ring and each segment having an overhanging lip at the top thereof facing outwardly of the center of said generally polygonal ring and adapted to form a lens groove in an eyeglass frame, said segments being mounted on an inverted cup shaped retainer which is positioned in said ejection cavity block, radial slots in a top flat portion of said cup shaped retainer, said segments each being individually slideable in one of said slots and each carrying a cam follower pin at the bottom thereof, said cam follower pins being mounted in cam tracks in an underlying face cam, said face cam comprising the top surface of a cylindrical barrel cam, said barrel cam having cam follower tracks on the cylindrical surface thereof, and cam followers engaged in said barrel cam follower tracks and attached to an actuating ejector plate, means associated with said actuating ejector plate for causing reciprocating movement of said actuating ejector plate, whereby when said actuating ejector plate is raised to contact said ejector plate said cam followers will slide in the barrel cam tracks and rotate said barrel cam thus turning said face cam tracks and causing said cam follower pins and attached segments to move radially with respect to said face cam.

3. The improved machine of claim 1 wherein said face cam comprises an inner substantially circularly arranged group of curved cam tracks and an outer substantially circularly arranged group of curved cam tracks.

4. The improved machine of claim 3 wherein the plurality of adjacent moveable segments comprise alternately large and small segments forming a generally polygonal rim.

5. The improved machine of claim 4 wherein the cam follower pins of the smaller segments are engaged in the cam follower tracks of the outer ring of curved cam follower tracks and the cam follower pins of the larger segments are engaged in the cam follower tracks of the inner curved cam follower tracks whereby when said face cam is rotated the smaller segments will move before movement of the larger segments.

6. In a molding apparatus, comprising an injection cavity block and an ejection cavity block, the improvement which comprises incorporating a collapsible core die assembly means in the ejection cavity block, said collapsible core die assembly means comprising a plurality of adjacent moveable segments forming a generally polygonal ring and each having an overhanging lip at the top thereof facing outwardly of the center of said generally polygonal ring and adapted to form a lens groove in an eyeglass frame, said segments being mounted on a retainer, radial slots in a top flat portion of said retainer, said segments each being individually slideable in one of said slots and each carrying a cam follower pin at the bottom thereof, said cam follower pins being mounted in cam tracks in an underlying face cam which face cam comprises the top surface of a cylindrical barrel cam, said barrel cam having cam follower tracks on a cylindrical surface thereof, and cam followers engaged in said barrel cam follower tracks and being attached to an actuating ejector plate whereby when said actuating ejector plate is raised said cam followers will slide in the barrel cam tracks and rotate said barrel cam thus turning said face cam tracks and causing said cam follower pins to move radially with respect to said face cam.

7. In a molding apparatus for forming a molded thermoplastic article having an indentation comprising an injection cavity block and an ejection cavity block, the improvement which comprises incorporating a collapsible core die assembly means in the ejection cavity block, said collapsible core die assembly means comprising a plurality of adjacent movable segments forming a polygonal ring and each having an overhanging lip facing outwardly of the center of said polygonal ring and adapted to form said indentation in said thermoplastic article, said segments being mounted on a retainer which is positioned in said ejection block, radial slots in said retainer, said segments each being individually slideable in one of said slots and each carrying a cam follower pin at the bottom thereof, said cam follower pins being mounted in cam tracks in an underlying face cam which face cam comprises the top surface of a cylindrical barrel cam, said barrel cam having cam follower tracks on the cylindrical surface thereof, and cam followers engaged in said barrel cam follower tracks and being attached to an actuating ejector means whereby when said actuating ejector means is raised said cam followers will slide in the barrel cam tracks and rotate said barrel cam thus turning said face cam tracks and causing said cam follower pins to move radially with respect to said face cam.

8. A collapsible core die assembly adaptable to form an indentation in a molded thermoplastic article; said assembly comprising; a plurality of adjacent moveable segments forming a ring and each having a lip facing outwardly and adapted to form said indentation in said thermoplastic article; said segments being mounted on a retainer means; radial slots in said retainer means; said segments each being individually slideable in one of said slots and each segment carrying a cam follower at the bottom thereof; said cam followers being mounted in cam tracks in an underlying face cam which face cam comprises the end surface of a cylindrical barrel cam; said barrel cam having cam follower tracks on the cylindrical surface thereof; and second cam followers engaged in said barrel cam follower tracks and being attached to an actuating ejector means whereby when said actuating ejector means is raised, said second cam followers will slide in the barrel cam follower tracks and rotate said barrel cam, thus turning said face cam tracks and causing said cam follower pins to move radially with respect to said face cam.

9. A collapsible core die assembly adaptable for use in a mold to form an indentation in a molded thermoplastic article; said assembly comprising: a plurality of adjacent moveable segments adapted to form said indentation in said thermoplastic article; each of said segments having a lip facing outwardly; said segments being mounted on a retainer means; radial slots in said retainer means; said segments each being individually slideable in one of said slots and each segment carrying a cam follower at the end thereof; said cam followers being mounted in cam tracks in an underlying face cam, which face cam is mounted on the end of a rotatable member; said rotatable member having first cam means on the surface thereof; and second cooperating cam means engaged with said first cam means and being operatively connected to an actuating ejector means; whereby when said actuating ejector means is moved to open or close the mold, said second cam means will move parallel to the longitudinal axis of said rotatable member and rotate said rotatable member, thus turning said face cam tracks and causing said cam follower pins to move radially with respect to said retainer means.

References Cited by the Examiner
UNITED STATES PATENTS

| | | |
|---|---|---|
| 245,138 | 8/1881 | Connelly. |
| 639,508 | 12/1889 | Bonta. |
| 693,571 | 2/1902 | Shaw. |
| 1,030,364 | 6/1912 | Whitman. |
| 3,104,425 | 9/1963 | Crane et al. _____ 18—2 XR |

J. SPENCER OVERHOLSER, *Primary Examiner.*

J. H. FLINT, *Examiner.*